(12) United States Patent
Kim et al.

(10) Patent No.: US 11,007,850 B2
(45) Date of Patent: May 18, 2021

(54) HEAT PUMP SYSTEM FOR VEHICLE

(71) Applicants: Hyundai Motor Company, Seoul (KR); Kia Motors Corporation, Seoul (KR); Hanon Systems, Daejeon (KR)

(72) Inventors: Jae Yeon Kim, Hwaseong-si (KR); SungJe Lee, Daejeon (KR); Hae Jun Lee, Daejeon (KR); In Guk Hwang, Daejeon (KR)

(73) Assignees: Hyundai Motor Gompany, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 84 days.

(21) Appl. No.: 16/668,472

(22) Filed: Oct. 30, 2019

(65) Prior Publication Data

US 2021/0001688 A1 Jan. 7, 2021

(30) Foreign Application Priority Data

Jul. 1, 2019 (KR) .......................... 10-2019-0078998

(51) Int. Cl.
| | |
|---|---|
| *F25B 1/00* | (2006.01) |
| *B60H 1/32* | (2006.01) |
| *B60H 1/14* | (2006.01) |

(52) U.S. Cl.
CPC ........... *B60H 1/3213* (2013.01); *B60H 1/143* (2013.01)

(58) Field of Classification Search
CPC .............................. B60H 1/3213; B60H 1/143
USPC ............................................................ 62/115
See application file for complete search history.

(56) References Cited

U.S. PATENT DOCUMENTS

| | | | |
|---|---|---|---|
| 8,215,432 B2 | 7/2012 | Nemesh et al. | |
| 8,899,062 B2 | 12/2014 | Kadle et al. | |
| 9,109,840 B2 | 8/2015 | Kadle et al. | |
| 9,239,193 B2 | 1/2016 | Kadle et al. | |
| 2013/0283838 A1 | 10/2013 | Kadle et al. | |
| 2016/0272044 A1* | 9/2016 | Cheng | B60H 1/143 |
| 2018/0339570 A1* | 11/2018 | Lee | B60H 1/00392 |
| 2020/0122545 A1* | 4/2020 | Lee | B60H 3/02 |
| 2020/0369108 A1* | 11/2020 | Kim | B60H 1/00571 |

FOREIGN PATENT DOCUMENTS

| | | |
|---|---|---|
| CN | 103380339 B | 1/2016 |
| JP | 5336033 B2 | 11/2013 |

* cited by examiner

*Primary Examiner* — Davis D Hwu
(74) *Attorney, Agent, or Firm* — Morgan, Lewis & Bockius LLP

(57) ABSTRACT

A heat pump system for a vehicle cools or warms a battery module by use of one chiller in which a coolant and a refrigerant exchange heat such that the system may be simplified, and heating efficiency may be improved by selectively using an external air heat source and waste heat of an electrical component in a heating mode of the vehicle.

18 Claims, 7 Drawing Sheets

HEAT PUMP SYSTEM FOR VEHICLE

CROSS-REFERENCE TO RELATED APPLICATION

The present application claims priority to Korean Patent Application No. 10-2019-0078998 filed on Jul. 1, 2019, the entire contents of which is incorporated herein for all purposes by this reference.

BACKGROUND OF THE INVENTION

Field of the Invention

The present invention relates to a heat pump system for a vehicle. More particularly, the present invention relates to a heat pump system for a vehicle to cool a battery module by use of one chiller where a refrigerant and a coolant exchange heat, and improve heating efficiency by absorbing waste heat of an electrical component.

Description of Related Art

In general, an air conditioner for a vehicle includes an air conditioning system for circulating a coolant to heat or cool an interior of the vehicle.

Such an air conditioner maintains a comfortable interior environment by maintaining an internal temperature of the vehicle at an appropriate level regardless of an external temperature change, so that the interior of the vehicle is warmed or cooled through heat exchange by an evaporator during a process in which a refrigerant discharged by driving of a compressor circulates back to the compressor after passing through a condenser, a receiver dryer, an expansion valve, and an evaporator.

That is, the air conditioner system condenses a gaseous coolant of a high temperature and a high pressure compressed by the compressor in a cooling mode in the summer to reduce a temperature and humidity of the interior of the vehicle through evaporation in the evaporator through the receiver dryer and the expansion valve.

In recent years, interest in energy efficiency and environmental pollution has increased, and development of an environmentally-friendly vehicle configured for substantially replacing the internal combustion engine vehicle has been demanded. Such environmentally-friendly vehicles are classified into an electric vehicle driven by use of fuel cells or electric power sources, and a hybrid vehicle driven by use of an engine and a battery.

Of these environment-friendly vehicles, electric vehicles or hybrid vehicles do not have separate heaters, unlike ordinary vehicle air conditioners, and air conditioning devices that are applied to environmentally-friendly vehicles are commonly referred to as heat pump systems.

In the meantime, the electric vehicle converts chemical reaction energy of oxygen and hydrogen into electrical energy to generate driving power, and in the present process, thermal energy is generated by the chemical reaction within a fuel cell, so that it is essential to effectively remove the generated heat for securing performance of the fuel cell.

Furthermore, the hybrid vehicle generates driving power by driving a motor by use of electricity supplied from the fuel cell or an electric battery together with an engine operated by use of a general fuel, so that only when heat generated from the fuel cell, the battery, and the motor is effectively removed, performance of the motor may be secured.

Therefore, in a hybrid vehicle or an electric vehicle according to the conventional art, a cooling means, a heat pump system, and a battery cooling system may be separately provided as a closed circuit to prevent heat generation from a motor, an electrical component, and a battery including fuel cells.

Thus, a cooling module mounted at a front of the vehicle is increased in size and weight, and the layout of connection pipes that supply a refrigerant or a coolant to the heat pump system, the cooling means, and the battery cooling system respectively in the engine compartment is complicated.

Furthermore, since a battery cooling system is separately provided to increase or lower a temperature of the battery according to a state of the vehicle for optimum performance of a battery, and a plurality of valves are applied for connection with the respective connection pipes, a plurality of valves are applied for connection of pipes, the valves are frequently opened and closed, and noise and vibration due to the frequent opening and closing operations of the valves are transmitted to the interior of the vehicle, deteriorating the ride quality.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a heat pump system for a vehicle, in which a battery module is cooled by use of one chiller in which a coolant and a refrigerant are heat-exchanged, and waste heat of an electrical component is absorbed such that the system may be simplified.

Furthermore, the present invention is directed to providing a heat pump system for a vehicle which can improve the heating efficiency by selectively using an external heat source and the waste heat of the electric component in a heating mode of the vehicle.

A heat pump system for a vehicle, may include a first cooling device that includes a first radiator and a first water pump connected through a first coolant line, and circulates a coolant in the first coolant line to cool at least one electrical component; a second cooling device that includes a second radiator and a second water pump connected through a second coolant line, and circulates a coolant in the second coolant line; a battery module which is provided in a battery coolant line selectively connectable to the second coolant line through a first valve, and in which a coolant circulates through operation of a third water pump provided in the battery coolant line; a heating device that includes first and second connection lines selectively connectable to the second coolant line through a second valve, and the fourth water pump and the coolant heater provided in the first connection line to warm the interior of the vehicle with a high-temperature coolant; and a chiller which is provided in a branch line connected to the battery coolant line through a third valve and through which the coolant passes, connected to a refrigerant line of an air conditioner through a refrigerant connection line, and controls a temperature of the coolant through heat exchange between a selectively introduced coolant and a refrigerant supplied from the air conditioner, wherein a main heat exchanger provided in the air conditioner is connected to the first coolant line and the first connection line such that a coolant circulating through the first cooling device and a coolant circulating through the heating device which is connected to the second cooling device respectively pass therethrough, and a refrigerant passing through the main heat exchanger primarily exchanges heat with a coolant supplied through the first coolant line in the main heat exchanger, and then secondarily exchanges heat with a coolant supplied through the first connection line.

The air conditioner may include: a heating, ventilation, and air conditioning (HVAC) module provided with a water-cooled type of internal heater connected to the first connection line to supply a temperature-increased coolant in a heating mode of the vehicle, and an to open or close door connected through the refrigerant line and controlling external air passed through an evaporator of the HVAC module to be selectively introduced into the water-cooled type of internal heater according to a cooling mode, a heating mode, and a dehumidification mode of the vehicle; a compressor connected through the refrigerant line between the evaporator and the main heat exchanger; a first expansion valve which is provided in the refrigerant line that connects the main heat exchanger and the evaporator; a second expansion valve which is provided at a front end portion of the chiller in the refrigerant connection line; an accumulator which is provided in the refrigerant line between the evaporator and the compressor, and connected to the refrigerant connection line; a sub-heat exchanger which is provided in the refrigerant line between the main heat exchanger and the evaporator; and a third expansion valve which is provided in the refrigerant line between the main heat exchanger and the sub-heat exchanger.

The sub-heat exchanger may additionally condense a refrigerant condensed in the main heat exchanger through heat exchange with external air when the main heat exchanger condenses the refrigerant, and when the third expansion valve expands a refrigerant and supplies the expanded refrigerant, the sub-heat exchanger evaporates the refrigerant condensed in the main heat exchanger through heat exchange with external air.

The third expansion value may expand a refrigerant passed through the main heat exchanger and may supply the expanded refrigerant to the sub-heat exchanger in the heating mode of the vehicle.

The second expansion valve may be actuated when the battery module is cooled by use of a refrigerant, and may expand a refrigerant introduced through the refrigerant connection line and may introduce the expanded refrigerant to the chiller.

The first expansion valve may expand a refrigerant passed through the main heat exchanger in the cooling mode or in the heating and dehumidification modes of the vehicle.

The first valve may selectively connect the second coolant line and the battery coolant line, or the second coolant line and the first connection line; the branch line may be connected to the third valve through one end portion thereof, and the other end portion of the branch line may be connected to the first coolant line between the first radiator and the first water pump through a fourth valve while crossing the battery coolant line between the first valve and the battery module; and the second connection line may be connected to the second valve through one end portion thereof, and the other end portion of the second connection line may be connected to the first coolant line between the electrical component and the first radiator through a fifth valve while crossing the second coolant line between the second radiator and the third valve.

When the electrical component is cooled by use of a coolant cooled by the first radiator and the battery module is cooled by use of a coolant cooled by the second radiator, the first valve may connect the second coolant line and the battery coolant line and may close the second coolant line connected to the second valve, the third and fourth valves may close the branch line, a coolant may circulate through the first coolant line through operation of the first water pump to supply a coolant to the electrical component, a coolant may circulate through the second coolant line, the battery coolant line, and the battery module through operation of the third water pump to supply a coolant to the battery module, and the first cooling device and the second cooling device may respectively form independent closed circuits for circulation of the coolant.

When the electrical component and the battery module are cooled in the cooling mode of the vehicle, in the first cooling device, the connection with the branch line may be blocked through operation of the fourth valve, a coolant cooled in the first radiator may circulates through the electric component through operation of the first water pump, the fourth valve, and the fifth valve, the battery coolant line may be connected to the branch line opened through operation of the third valve and the connection with the second coolant line may be closed through operation of the first and third valves, the second coolant line and the first and second connection lines may be connected through operation of the second valve, and in the air conditioner, a refrigerant may circulate along the refrigerant line through operation of the first expansion valve, the second expansion valve may expand a refrigerant such that the expanded refrigerant is introduced into the chiller through the refrigerant connection line, and the third expansion valve may not expand a refrigerant passed through the main heat exchanger and supplies the refrigerant to the sub-heat exchanger.

In the first cooling device, a coolant cooled in the first radiator may be supplied to the main heat exchanger through operation of the first water pump, in the second cooling device, a coolant cooled in the second radiator may be supplied to the main heat exchanger connected to the first connection line while circulating along the first and second connection lines through operation of the second and fourth water pumps, and the main heat exchanger may condense a refrigerant through heat exchange with the respective coolants.

When an external heat source and waste heat of the electrical component are recovered in the heating mode of the vehicle, in the first cooling device, the first coolant line that connects the first radiator and the electrical component may be closed through operation of the fourth and fifth valves, the branch line may be connected to the first coolant line which is connected to the electrical component while being opened through operation of the third and fourth valves, a coolant may circulate through the electrical component through operation of the first water pump, the coolant passed through the electrical component may pass through a portion of the second connection line connected through the fifth valve and a portion of the second coolant line connected to the third valve while crossing the second connection line, and then may pass through the chiller through the branch line, the second and third water pumps may stop operating, in the heating device, the first connection line may be opened through operation of the second valve, and the first connection line may form an independent closed circuit while being in a closed state, in the air conditioner, the refrigerant that connects the main heat exchanger and the evaporator may be closed through operation of the first expansion valve, the refrigerant line and the refrigerant connection line may be connected to connect the main heat exchanger and the chiller through operation of the second expansion valve, and the second expansion valve and the third expansion valve may expand refrigerants and supply the expanded refrigerants respectively to the sub-heat exchanger and the chiller.

When an external air heat source and waste heat of the electrical component are recovered in the heating and dehumidification modes of the vehicle, in the first cooling device, the first coolant line that connects the first radiator and the electrical component may be closed through operation of the fourth and fifth valves, the branch line may be connected to the first coolant line which is connected to the electrical component while being opened through operation of the third and fourth valves, a coolant may circulate through the electrical component through operation of the first water pump, the coolant passed through the electrical component may pass through a portion of the second connection line connected through the fifth valve and a portion of the second coolant line connected to the third valve while crossing the second connection line, and then may pass through the chiller through the branch line, the second and third water pumps may stop operating, in the heating device, the first connection line may be opened through operation of the second valve, the first connection line may form an independent closed circuit while the second connection line is in the closed state, and a coolant may circulate through the first connection line through operation of the fourth water pump, in the air conditioner, the refrigerant line that connects the main heat exchanger and the evaporator may be opened through operation of the first expansion valve, the refrigerant line and the refrigerant connection line may be connected to connect the main heat exchanger and the chiller through operation of the second expansion valve, and the first, second, and third expansion valves may respectively expand refrigerants and respectively supply the expanded refrigerants to the sub-heat exchanger, the evaporator, and the chiller.

When the heating mode of the vehicle is conducted with water heat of the electrical component, in the first cooling device, the first coolant line that connects the first radiator and the electrical component may be closed through operation of the fourth and fifth valves, the branch line may be connected to the first coolant line which is connected to the electrical component while being opened through operation of the third and fourth valves, a coolant may circulate through the electrical component through operation of the first water pump, the coolant passed through the electrical component may pass through a portion of the second connection line connected through the fifth valve and a portion of the second coolant line connected to the third valve while crossing the second connection line, and then may pass through the chiller through the branch line, in the second cooling device, the second coolant line connected to the second radiator and the battery coolant line connected to the battery module may be closed through operation of the first and third valves, a coolant may circulate through the battery coolant line connected to the first valve while crossing the branch line and the second coolant line connected to the first valve through operation of the second water pump, third water pump stops operating, and in the heating device, the first and second connection lines may be opened through operation of the second valve, a coolant introduced into the second coolant line connected to the second valve may circulate through the first connection line and the second connection line through operation of the fourth water pump.

When a temperature of the battery module is increased, the first water pump may stop operating and thus circulation of the coolant may stop in the first coolant line in the first cooling device, the second coolant line connected to the second radiator may be closed and the battery coolant line connected to the battery module may be opened in the second cooling device through operation of the first valve, the branch line may be opened through operation of the third valve, and the branch line may be connected to the battery coolant line which is connected to the battery module while the connection with the first coolant line is closed through operation of the fourth valve, a portion of the coolant passed through the battery module and flowed along the branch line may circulate through the battery coolant line and the second coolant line connected to the first valve while crossing the branch line through the second water pump, third water pump may stop operating, and in the heating device, the first and second connection lines may be opened through operation of the second valve, a coolant introduced into the second coolant line connected to the second valve may circulate through the first connection line and the second connection line through operation of the fourth water pump.

The first, second, and expansion valves may be electronic expansion valves that selectively expand a refrigerant while controlling a flow of the refrigerant.

The heating device in the heating mode of the vehicle may carry out heating of the interior of the vehicle by use of waste heat generated from the electrical component in a state that operation of the air conditioner is stopped.

The chiller may recover waste heat of the electrical component through heat exchange between a coolant passed through the electrical component and a refrigerant in the heating mode of the vehicle, and when the battery module is cooled, a coolant supplied to the battery module may be cooled through heat exchange with a refrigerant The main heat exchanger may include: a first radiator connected to the first coolant line; a second radiator connected to the first connection line; and a partition wall that partitions the first radiator and the second radiator in the main heat exchanger to prevent coolants respectively supplied from the first cooling device and the heating device connected to the second cooling device from being mixed, and allows a refrigerant to pass therethrough.

As described above, in the vehicle heat pump system for the vehicle according to an exemplary embodiment of the present invention, the battery module is cooled according to the vehicle mode using one chiller in which the coolant and the coolant are heat-exchanged in the electric vehicle, and waste heat of the electrical component is absorbed such that the system may be simplified.

Furthermore, the present invention can efficiently optimize the performance of a battery module by efficiently warming and cooling the battery module to the vehicle's mode, and increasing the overall travel distance of the vehicle through efficient management of the battery module.

Furthermore, the present invention can improve the heating efficiency by selectively recovering the external heat source and the waste heat of the electric component in the heating mode of the vehicle to heat the interior of the vehicle.

Furthermore, the present invention improves condensation performance of a refrigerant through a main heat exchanger that dually condenses the refrigerant by use of coolants respectively supplied from the first and second cooling devices, improving the cooling performance and reducing the power consumption of the compressor.

Furthermore, the present invention can reduce power consumption by directly using the waste heat of the electrical component in the heating mode of the vehicle.

Furthermore, the present invention can reduce production cost and weight by simplifying the entire system and improve space utilization.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
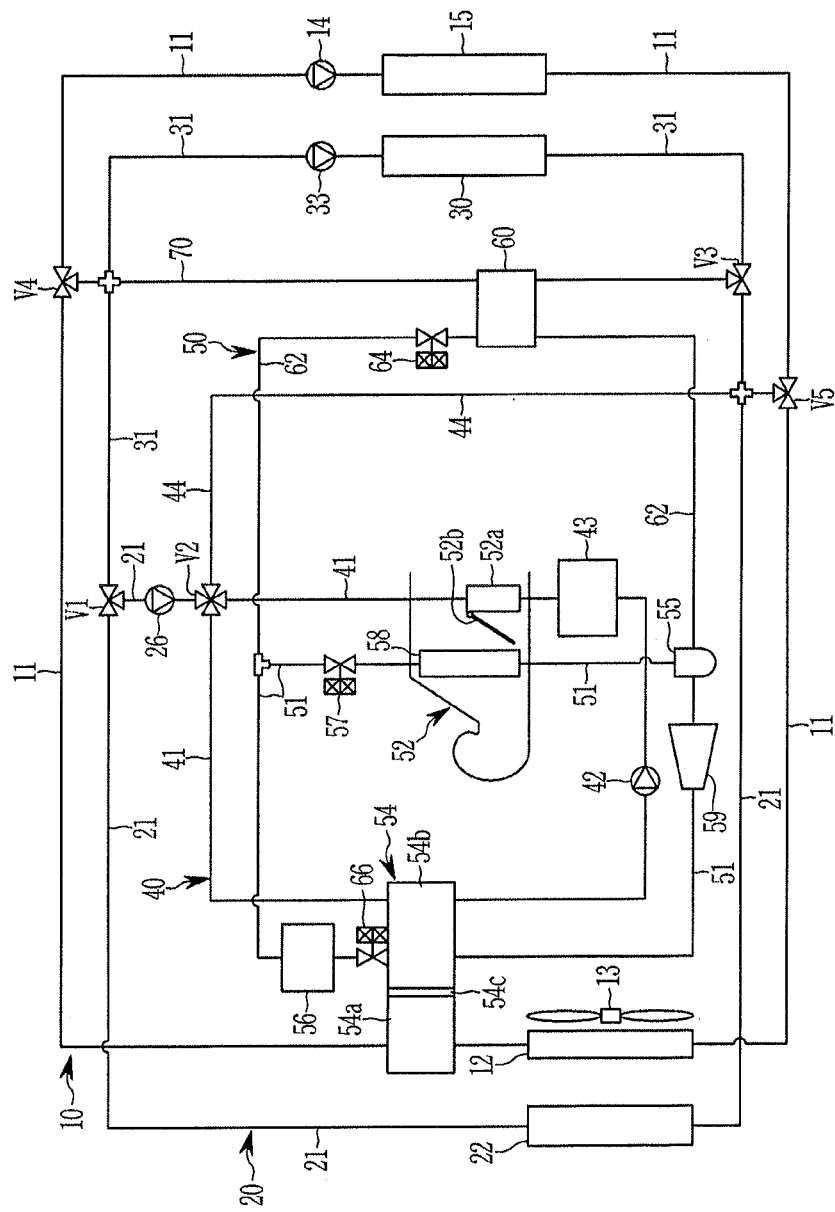
FIG. 1 is a block diagram of a heat pump system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Although embodiments have been described with reference to a number of illustrative embodiments thereof, it may be understood that numerous other modifications and embodiments may be devised by those skilled in the art that will fall within the spirit and scope of the principles of the present invention.

The drawings and description are to be regarded as illustrative in nature and not restrictive. Like reference numerals designate like elements throughout the specification.

Since the size and the thickness of each configuration shown in the drawings are arbitrarily indicated for better understanding and ease of description, the present invention is not limited to the shown drawings, and the thickness of layers, films, panels, regions, etc., are exaggerated for clarity.

Furthermore, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . means" and " . . . member" described in the specification mean a unit of a collective configuration to perform at least one function or operation.

FIG. 1 is a block diagram of a heat pump system for a vehicle according to an exemplary embodiment of the present invention.

A heat pump system for a vehicle according to an exemplary embodiment of the present invention may heat or cool a battery module 30 by use of a single chiller 60 where a refrigerant and a coolant exchange heat, and may improve heating efficient by use of a waste heat of an electrical component 15.

Here, in the heat pump system, a first cooling device 10 that cools the electrical component 15, a second cooling device 20 that cools the battery module 30, a heating device 40 that heats the interior by use of a high-temperature coolant, and an air conditioning device 50 may interwork with each other in an electric vehicle.

That is, referring to FIG. 1, the heat pump system includes the first and second cooling devices 10 and 20, the battery module 30, the heating device 40, and the chiller 60.

The first cooling device 10 includes a first radiator 12 and a first water pump 14 connected through a first coolant line 11. Such a first cooling device 10 circulates a coolant in the first coolant line 11 through operation of the first water pump 14 to cool the electrical component 15.

The first radiator 12 is provided in a front of the vehicle, and a cooling fan 13 is provided behind the first radiator 12 such that the coolant is cooled by operation of the cooling fan 13 and through heat exchange with external air.

Here, the electrical component 15 may include a motor, a power controller, an inverter, an on-board charger (OBC), and the like. The motor, the power controller, and the inverter may generate heat while driving, and the OBC may generate heat when charging the battery module 30.

The first cooling device 10 having such a configuration circulates a coolant cooled in the first radiator 12 along the first coolant line 11 by operation of the first water pump 14 to thereby prevent the electrical component 15 from being overheated.

In the exemplary embodiment of the present invention, the second cooling device 20 includes a second radiator 22 and a second water pump 26 connected through a second coolant line 21, and circulates a coolant in the second coolant line 21.

Such a second cooling device 20 can selectively supply a coolant cooled in the second radiator 22 to the battery module 30.

The second radiator 22 is mounted in front of the first radiator 12, and cools a coolant by operation of the cooling fan 13 and through heat exchange with external air.

The second cooling device 20 having such a configuration may circulate a coolant cooled in the second radiator 22 along the second coolant line 21 by operation of the second water pump 26.

In the exemplary embodiment of the present invention, the battery module 30 is provided in a battery coolant line 31 which is selectively connectable to the second coolant line 21 through a first valve V1.

Here, the first valve V1 may selectively connect the second coolant line 21 and the battery coolant line 31 between the second radiator 22 and the battery module 30.

The battery module 30 supplies power to the electrical component 15, and is formed as a water-cooled type which is cooled by a coolant that flows along the battery coolant line 31.

That is, the battery module 30 is selectively connectable to the second cooling device 20 through the battery coolant line 31 according to operation of the first valve V1. Furthermore, a coolant may circulate inside the battery module 30 by operation of a third water pump 33 provided in the battery coolant line 31.

Such a third water pump 33 operates to circulate the coolant through the battery coolant line 31.

In the exemplary embodiment of the present invention, the heating device 40 may include first and second connection lines 41 and 44 that are selectively connectable to the second coolant line 21 through a second valve V2, a fourth water pump 42, and a coolant heater 43 for heating the vehicle interior with a high-temperature coolant. The fourth water pump 42 and the coolant heater 43 are provided in the first connection line 41.

The coolant heater 43 may increase a temperature of the coolant by selectively heating the coolant circulating along the first connection line 41.

Such a heating device 40 may carry out heating of the interior by use of waste heat generated from the electrical component 15 while the air conditioning device 50 stops operating in a vehicle heating mode.

Here, the second valve V2 is connected to the second coolant line 21 which is connected through the first valve V1, disposing the second water pump 26 therebetween.

The second valve V2 may supply or circulate a coolant introduced through the second coolant line 21 to the first connection line 41, or may let the coolant passed through the first connection line 41 selectively flow to the second connection line 44.

The first connection line 41 may be connected to a water-cooled type of internal heater 52a which is provided inside an HVAC module 52.

Furthermore, the first, second, third, and fourth water pumps 14, 26, 33, and 42 may be electric water pumps.

In the exemplary embodiment of the present invention, the chiller 60 is provided in a branch line 70 connected to the battery coolant line 31 through the third valve V3 such that a coolant passes through an inside thereof, and is connected to a refrigerant line 51 of the air conditioning device 50 through a refrigerant connection line 62.

The chiller 60 can control a temperature of the coolant by heat exchanging a selectively introduced coolant with a refrigerant supplied from the air conditioning device 50. Here, the chiller 60 may be a water-cooled heat exchanger with a coolant introduced therein.

That is, the chiller 60 can recover the waste heat of the electrical component 15 through the heat exchange of the coolant and the coolant passing through the electrical component 15 in the heating mode of the vehicle.

Furthermore, the chiller 60 can cool the coolant supplied to the battery module 30 through the heat exchange with the refrigerant when cooling the battery module 30.

Meanwhile, in the exemplary embodiment of the present invention, the first valve V1 may selectively connect the second coolant line 21 and the battery coolant line 31, or the second coolant line 21 and the first connection line 41 connected through the second valve V2.

Furthermore, the branch line 70 is connected to the third valve V3 through one end portion thereof.

The other end portion of the branch line 70 may be connected to the first coolant line 11 between the first radiator 12 and the first water pump 14 through the fourth valve V4, while being in a state of crossing the battery coolant line 31 between the first valve V1 and the battery module 30.

Such a branch line 70 is selectively opened through operation of the third and fourth valves V3 and V4 in the heating mode of the vehicle when the temperature of the coolant is increased by absorbing the waste heat generated from the electrical component 15.

In the instant case, the first coolant line 11 connected to the first radiator 12 may be closed through operation of the second valve V4.

Furthermore, the branch line 70 is selectively opened through operation of the third valve V3, even when the battery module 30 is cooled.

The first coolant line 11 connected to the first radiator 12 is opened through operation of the fourth valve V4, and the second coolant line 21 connected to the second radiator 22 may be opened through operation of the first and third valves V1 and V3.

The second connection line 44 is connected to the second valve V2 through one end portion thereof. The other end portion of the second connection line 44 may be connected to the first coolant line 11 between the electrical component 15 and the first radiator 12 through a fifth valve V5, while being in a state of crossing the second coolant line 21 between the second radiator 22 and the third valve V3.

Here, the first valve V1 controls a flow of the coolant by selectively connecting or closing the second coolant line 21 and the battery coolant line 31.

That is, when cooling the battery module 30 by use of a coolant cooled in the second radiator 22, the first valve V1 may connect the second coolant line 21 connected to the second radiator 22, and the battery coolant line 31.

Accordingly, the coolant cooled in the second radiator 22 can cool the battery module 30 while flowing along the second coolant line 21 and the battery coolant line 31 connected through operation of the first valve V1.

Furthermore, the first valve V1 can close the connection between the second coolant line 21 and the battery coolant line 31 when the battery module 30 is cooled using a coolant heat-exchanged with a refrigerant.

Accordingly, the coolant of the low temperature, which has been heat exchanged with the refrigerant at the chiller 60, is opened by the third valve V3 and then introduced into the battery module 30 through the branch line 70 which is not connected to the first coolant line 11 by the fourth valve V4 such that the battery module 30 may be effectively cooled.

On the other hand, when the temperature of the battery module 30 is increased, the coolant circulating along the battery coolant line 31 may be prevented from being introduced into the second radiator 12 by operation of the first valve V1.

Thus, the battery module 30 can rapidly heat the battery module 30 by introducing the coolant heated through operation of the coolant heater 43 provided in the heating device 40 to the battery module 30.

Meanwhile, in the exemplary embodiment of the present invention, the air conditioning device 50 includes the heating, ventilation, and air conditioning (HVAC) module 52, a main heat exchanger 54, an accumulator 55, a first expansion valve 57, an evaporator 58, a compressor 59, a second expansion valve 64, and a third expansion valve 66, which are connected through the refrigerant line 51.

First, the HVAC module 52 may include the water-cooled type of internal heater 52a connected to the first connection line 41 to supply a coolant of which a temperature is increased in the heating mode of the vehicle.

Such an HVAC module 52 is connected through the refrigerant line 51, and is provided with an door 52b that controls external air passed through the evaporator 58 to be selectively introduced into the water-cooled type of internal heater 52a according to a cooling mode, a heating mode, and a heating/dehumidification mode of the vehicle.

That is, the door 52b is opened for introduction of external air passed through the evaporator 58 into the water-cooled type of internal heater 52a in the heating mode of the vehicle.

On the other hand, the door 52a closes the water-cooled type of internal heater 52a for direct introduction of external air cooled while passing through the evaporator 59 into the vehicle in the cooling mode of the vehicle.

The main heat exchanger 54 is connected to the refrigerant line 51 and thus a refrigerant is passed therethrough, and is connected to the first coolant line 11 and the first connection line 41 to enable a coolant circulating through the first cooling device 10 and a coolant circulating through the heating device 40 connected to the second cooling device 20 to respectively pass therethrough.

That is, the coolant circulating through the first cooling device 10 and coolant circulating through the second cooling device 20 through the heating device 40 can, respectively pass through the main heat exchanger 54.

Such a main heat exchanger 54 may condense a refrigerant through heat exchange with the coolants respectively supplied through the first coolant line 11 and the first connection line 41 depending on a mode of the vehicle. That is, the main heat exchanger 54 may be a water-cooled type of heat exchanger into which a coolant is introduced.

Here, the main heat exchanger 54 may include a first radiator 54a, a second radiator 54b, and a partition wall 54c.

First, the first radiator 54a is connected to the first coolant line 11. Accordingly, the first radiator 54a may primarily heat exchange a refrigerant supplied from the compressor 59 with a coolant supplied from the first cooling device 10.

The second radiator 54b is connected to the first connection line 21. Accordingly, the second radiator 54b may secondarily heat exchange a refrigerant passed through the first radiator 54a with a coolant supplied from the second cooling device 20.

Furthermore, the partition wall 54c may partition the first radiator 54a and the second radiator 54b in the main heat exchanger 54 to prevent the coolant supplied from the first cooling device 10 and the coolant supplied from the second cooling device 20 through the heating device 40 from mixing with each other. Such a partition wall 54c may let a refrigerant pass through such that the refrigerant may be introduced into the second radiator 54b from the first radiator 54a.

Accordingly, the refrigerant passed through the main heat exchanger 54 is primarily heat exchanged with the coolant supplied through the first coolant line 11 and secondarily heat exchanged with the coolant supplied through the first connection line 41.

The main heat exchanger 54 having such a configuration primarily heat exchanges a refrigerant supplied from the compressor 59 with the coolant supplied to the first cooling device 10 in the first radiator 54a.

Next, the main heat exchanger 54 secondarily heat exchanges a coolant supplied from the second cooling device 20 from the second radiator 54b through the heating device 40 with a refrigerant.

Through such an operation, the main heat exchanger 54 can further decrease a temperature of the refrigerant and increase a condensing amount.

In the exemplary embodiment of the present invention, the accumulator 55 is supplied with a refrigerant discharged from the evaporator 58.

Such an accumulator 55 improves efficiency and durability of the compressor 59 by supplying a refrigerant only in a gaseous state to the compressor 59.

Meanwhile, a sub-heat exchanger 56 may be provided in the refrigerant line 51 between the main heat exchanger 54 and the evaporator 58 to additionally condense the refrigerant passed through the main heat exchanger 54.

The refrigerant passed through the main heat exchanger 54 may be introduced into the sub-heat exchanger 56.

That is, the sub-heat exchanger 56 is mounted at a front side of the second radiator 22 to heat exchange between the refrigerant introduced thereinto with external air.

As described, the sub-heat exchanger 56 may increase sub-cooling of the refrigerant by further condensing the refrigerant condensed in the main heat exchanger 54, and accordingly, a coefficient of performance (COP), which is a coefficient of cooling capacity compared to power required by the compressor, may be improved.

In the exemplary embodiment of the present invention, the first expansion valve 57 is provided in the refrigerant line 51 that connects the sub-heat exchanger 56 and the evaporator 58. The first expansion valve 57 receives and expands the refrigerant passed through the sub-heat exchanger 56.

That is, the first expansion valve 57 may expand the refrigerant passed through the sub-heat exchanger 56 in the cooling mode or in the heating and dehumidification modes of the vehicle.

The compressor 59 is connected through the refrigerant line 51 between the evaporator 58 and the main heat exchanger 54. The compressor 59 compresses a refrigerant in a gaseous state, and supplies the compressed refrigerant to the main heat exchanger 54.

In the exemplary embodiment of the present invention, the second expansion valve 64 may be provided at a front end portion of the chiller 60 in the refrigerant connection line 62.

Such a second expansion valve 64 selectively opens and closes the refrigerant connection line 62, and selectively expands the refrigerant passing through the refrigerant connection line 62 to supply the refrigerant to the chiller 60.

That is, the second expansion valve 64 is actuated when the battery module 30 is cooled by use of a refrigerant. The second expansion valve 64 expands the refrigerant introduced through the refrigerant connection line 62 and introduces the expanded refrigerant to the chiller 60.

Accordingly, a coolant of which a temperature is decreased while passing through the chiller 60 is introduced into the battery module 30 for more efficient cooling.

Furthermore, the third expansion valve 66 may be provided in the refrigerant line 51 between the main heat exchanger 54 and the sub-heat exchanger 56.

Such a third expansion valve 66 selectively expands a refrigerant discharged from the main heat exchanger 54 and supplies the selectively expanded refrigerant into the sub-heat exchanger 56.

That is, when the main heat exchanger 54 condenses the refrigerant, the condensed refrigerant in the main heat exchanger 54 may be further condensed through heat exchange with external air.

Furthermore, when the third expansion valve 66 expands and supplies a refrigerant, the sub-heat exchanger 56 may evaporate the refrigerant condensed in the main heat exchanger 54 through heat exchange with external air.

Here, the third expansion valve 66 may expand a refrigerant passed through the main heat exchanger 54 and supply the expanded refrigerant to the sub-heat exchanger 56 in the heating mode of the vehicle.

Meanwhile, in the exemplary embodiment of the present invention, the refrigerant connection line 62 may be connected to the accumulator 55 such that the refrigerant passed through the chiller 60 may be selectively introduced into the compressor 59 via the accumulator 55.

Here, the accumulator 55 may supply a gaseous refrigerant in the refrigerant supplied through the refrigerant connection line 62 to the compressor 59.

In an exemplary embodiment of the present invention, the first, second, and third expansion valves 57, 64, and 66 may be electronic expansion valves that selectively expand the refrigerant while controlling the flow of the refrigerant.

In the instant case, the first, third, fourth, and fifth valves V1, V3, V4, and V5 may be three-way valves configured for distributing the flow rate, and the second valve V2 may be a four-way valve.

Hereinafter, the operation and effect of the heat pump system for a vehicle according to the exemplary embodiment of the present invention will be described in detail with reference to FIG. 2 to FIG. 7.

First, in the heat pump system for the vehicle according to the exemplary embodiment of the present invention, operation in a case that the electrical component 15 is cooled by use of the coolant cooled in the first radiator 12, and the battery module 30 is cooled by use of the coolant cooled in the second radiator 22, will be described with reference o FIG. 2.

Figure 2:
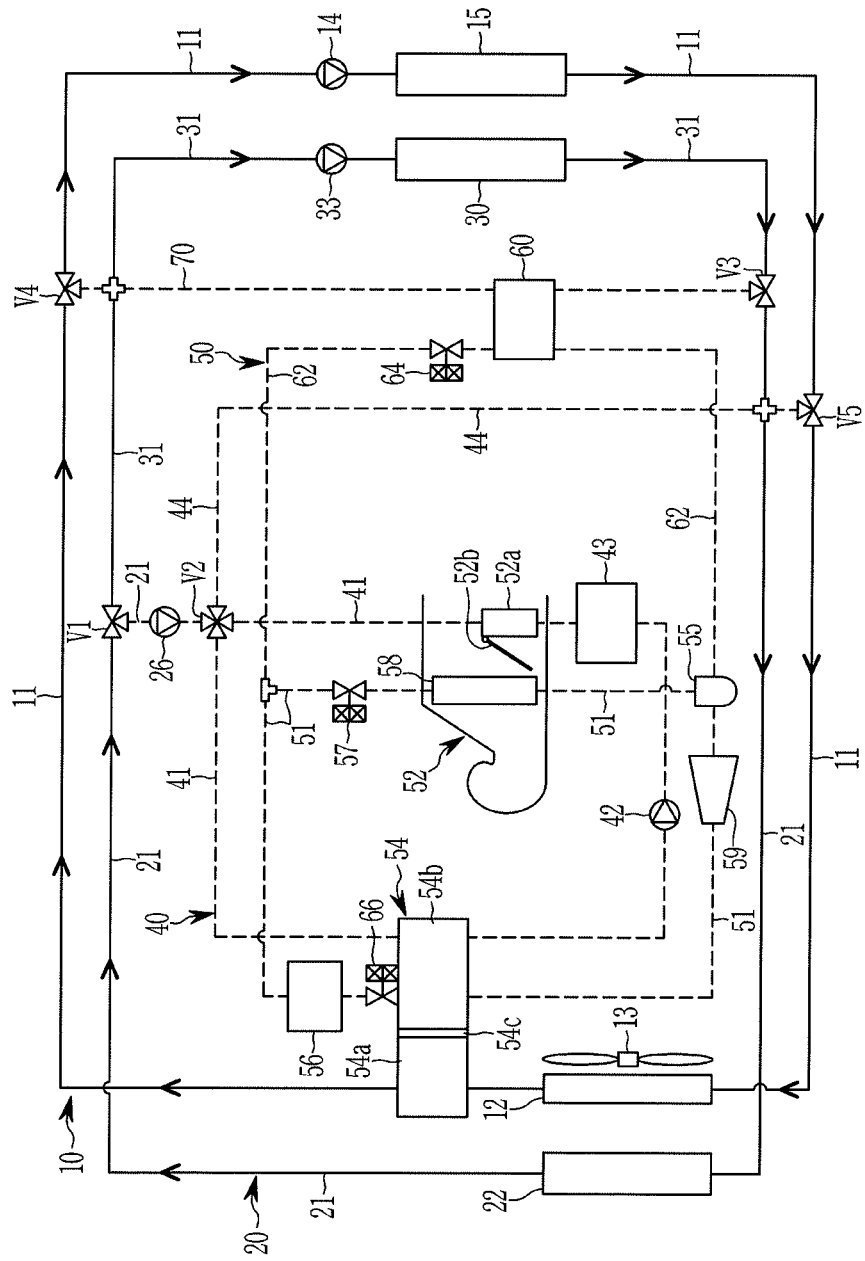
FIG. 2 is an operation state view in cooling of the electrical component and the battery module by use of the coolant in the heat pump system for the vehicle according to the exemplary embodiment of the present invention.

FIG. 2 is an operation state view in cooling of the electrical component 15 and the battery module by use of the coolant in the heat pump system for the vehicle according to the exemplary embodiment of the present invention.

Referring to FIG. 2, a coolant circulates in the first coolant line 11 through operation of the first water pump 14 for cooling the electrical component 15 in the first cooling device 10.

Accordingly, a coolant cooled in the first radiator 12 circulates in the electrical component 15.

In the instant case, the first valve V1 connects the second coolant line 21 and the battery coolant line 31 to supply the coolant cooled in the second radiator 22 to the battery module 30. Furthermore, the first valve V1 may close the second coolant line 21 connected to the second valve V2.

Simultaneously, the branch line 18 is closed by operation of the third and fourth valves V3 and V4.

That is, the second coolant line 21 and the battery coolant line 31 are connected to each other by selective operation of the first valve V1, and may form one closed circuit in which a coolant circulates.

Accordingly, a coolant cooled in the second radiator 22 may circulate in the second cooling device 20 along the second coolant line 21 and the battery coolant line 31 through operation of the third water pump 33.

That is, the coolant discharged from the second radiator 22 is introduced into the battery module 30 through the battery coolant line 31, and then cools the battery module 30.

The coolant that has cooled the battery module 30 is introduced back into the second radiator 22 through the battery coolant line 31 and the second coolant line 21.

Accordingly, the first cooling device 10 and the second cooling device 20 may circulate a coolant by respectively forming independent closed circuits.

That is, the coolant cooled in the first radiator 12 cools the electrical component 15, and the coolant of a low temperature, cooled in the second radiator 22, cools the battery module 30, and thus the electrical component 15 and the battery module 30 may be efficiently cooled.

Meanwhile, the air conditioning device 50 does not operate since the cooling mode of the vehicle is not actuated.

In the exemplary embodiment of the present invention, operation in cooling of the electrical component 15 and the battery module 30 in the cooling mode of the vehicle will be described with reference to FIG. 3.

Figure 3:
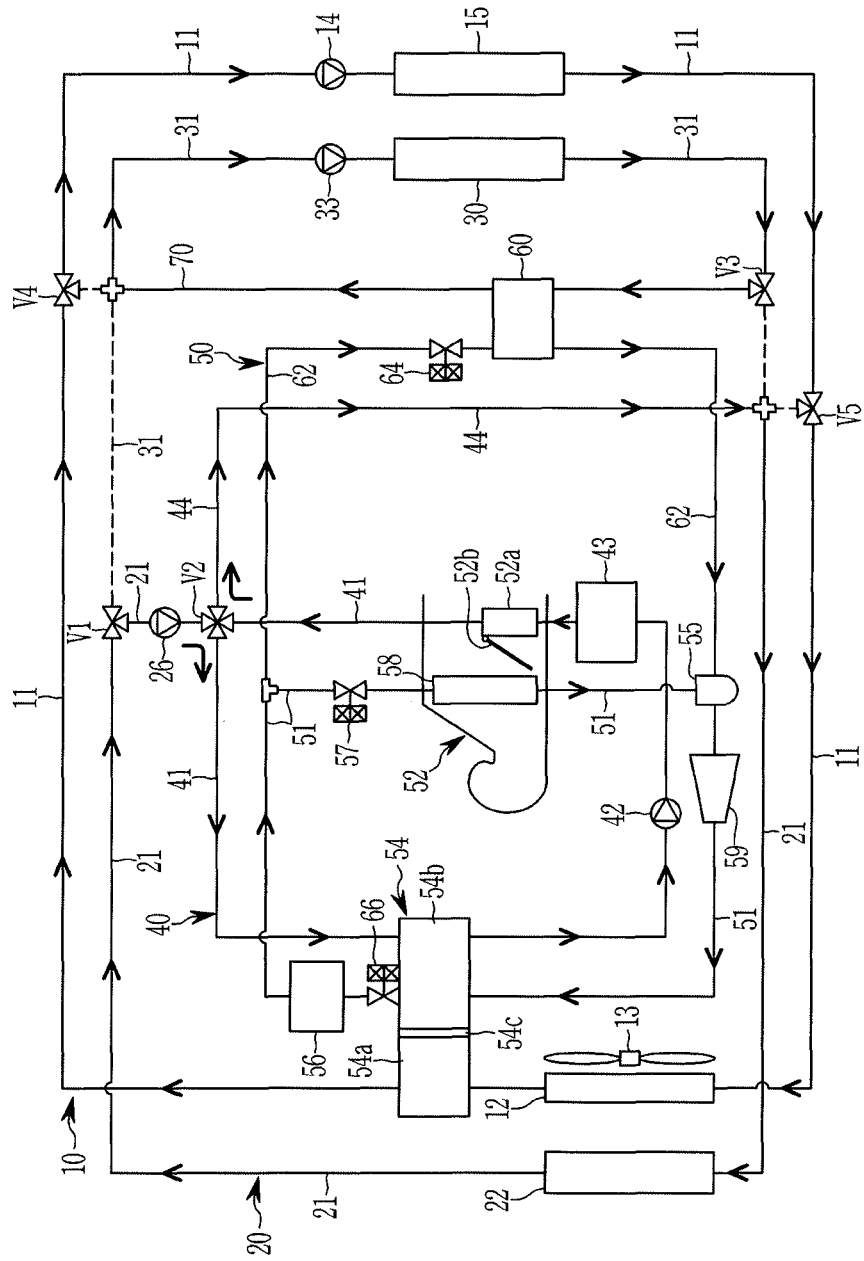
FIG. 3 is an operation state view of cooling of the electrical component and the battery module according to the cooling mode in the heat pump system for the vehicle according to the exemplary embodiment of the present invention.

FIG. 3 is an operation state view of cooling of the electrical component and the battery module according to the cooling mode in the heat pump system for the vehicle according to the exemplary embodiment of the present invention.

Referring to FIG. 3, the first water pump 14 is actuated in the first cooling device 10 to cool the electrical component 15 and the main heat exchanger 54.

The connection of the first coolant line 11 with the branch line 70 is blocked through operation of the fourth valve V4, and the connection of the first coolant line 11 through operation of the fifth valve V5.

Accordingly, the coolant cooled in the first radiator 12 is circulated in the electrical component 15 and the main heat exchanger 54 through operation of the first water pump 14 and the fourth and fifth valves V4 and V5.

That is, the coolant cooled in the first radiator 12 may be passed through the main heat exchanger 54 and then supplied to the electrical component 15 through operation of the first water pump 14 in the first cooling device 10.

The battery coolant line 31 is connected to the opened branch line 70 through operation of the third valve V3, and the connection of the opened branch line 70 with the second coolant line 21 is closed by operation of the first and third valves V1 and V3.

Here, the connection of the branch line 70 with the first coolant line 11 is blocked by operation of the fourth valve V4. The connection of the second connection line 44 with the first coolant line 11 may be blocked by operation of the fifth valve V5.

Accordingly, the battery coolant line 31 is connected to the opened branch line 70 and thus may form a closed circuit in which a coolant is independently circulated.

Accordingly, the coolant passed through the chiller 60 circulates through the battery coolant line 31 and the branch line 70 to cool the battery module 30 through operation of the third water pump 33.

In the second cooling device 20, the second water pump 26 operates to supply the coolant to the main heat exchanger 54 through the first connection line 41.

The second coolant line 21 connected through the first valve V1 is connected to the first and second connection lines 41 and 44 through operation of the second valve V2.

Thus, the coolant cooled in the second radiator 22 is introduced into the first connection line 41 through operation of the second water pump 26 and the second valve V2.

The coolant introduced into the first connection line 41 passes through the main heat exchanger 54 through operation of the fourth water pump 42. Next, the coolant is introduced into the second coolant line 21 along the second connection line 44, and thus may be supplied back to the second radiator 22.

Constituent elements of the air conditioning device 50 operate to cool the interior of the vehicle such that a refrigerant circulates along the refrigerant line 51.

Accordingly, the main heat exchanger 54 condenses the refrigerant by use of the coolant flowing along the first coolant line 11 and the first connection line 41.

That is, a coolant supplied to the main heat exchanger 54 through the first coolant line 11 primarily condenses the refrigerant that passes through the first radiator 54a of the main heat exchanger 54.

A coolant supplied to the main heat exchanger 54 through the first connection line 41 may secondarily condense the refrigerant that passes through the second radiator 54b of the main heat exchanger 54.

Accordingly, the main heat exchanger 54 can increase the condensed amount of the refrigerant.

The refrigerant passed through the main heat exchanger 54 is introduced into the sub-heat exchanger 56 along the opened refrigerant line 51 through operation of the third expansion valve 66. The refrigerant introduced into the sub-heat exchanger 56 may be condensed through heat exchange with external air.

Here, the third expansion valve 66 may supply the refrigerant passed through the main heat exchanger 54 to the sub-heat exchanger 56 without expanding the same.

A portion of the refrigerant passed through the sub-heat exchanger 56 is supplied to the evaporator 58 along the opened refrigerant line 51 through operation of the first expansion valve 57. In the instant case, the first expansion valve 57 may expand the refrigerant and then supply the expanded refrigerant to the evaporator 58.

Here, the second expansion valve 64 expands the rest of the refrigerant passed through the sub-heat exchanger 56 to supply the expanded refrigerant to the chiller 60, and opens the refrigerant connection line 62.

In the instant case, the coolant circulating the battery coolant line 31 is cooled by heat exchange with the refrigerant supplied to the chiller 60. The coolant cooled in the chiller 60 is supplied to the battery module 30. Accordingly, the battery module 30 is cooled by the cooled coolant.

Thus, the rest of the refrigerant discharged from the sub-heat exchanger 56 becomes a low temperature and low pressure state by being expanded through operation of the second expansion valve 64, and is introduced into the chiller 60 connected to the refrigerant connection line 62.

Next, the refrigerant introduced into the chiller 60 exchanges heat with the coolant, and then is introduced into the compressor 59 through the refrigerant connection line 62.

That is, the coolant of which the temperature is increased while cooling the battery module 30 is cooled through heat exchange with the low-temperature low-pressure refrigerant in the chiller 60. The cooled coolant is supplied to the battery module 30 through the battery coolant line 31.

That is, the coolant can effectively cool the battery module 30 while iteratively performing the above-stated operation.

Meanwhile, a portion of the refrigerant discharged from the sub-heat exchanger 56 flows to the refrigerant line 51 connected to the evaporator 58 while being expanded by operation of the first expansion valve 57 to cool the interior of the vehicle.

The coolant passed through the evaporator 58 sequentially passes through the accumulator 55, the compressor 59, the main heat exchanger 54, and the sub-heat exchanger 56.

Here, the external air introduced into the HVAC module 52 is cooled while passing through the evaporator 58 by the low-temperature refrigerant introduced into the evaporator 58.

In the instant case, the door 52b closes a portion through which the cooled external air may be passed to prevent the cooled external air from being passed therethrough. Accordingly, the cooled external air is directly introduced into the interior of the vehicle, cooling the interior of the vehicle.

Meanwhile, in the evaporator 58, the refrigerant having an increased amount of condensation is expanded and supplied while sequentially passing through the main heat exchanger 54 and the sub-heat exchanger 56, allowing the refrigerant to be evaporated to a lower temperature.

That is, in the exemplary embodiment of the present invention, the first and second radiators 54a and 54b primarily and secondarily condense the refrigerant and the sub-heat exchanger 56 additionally condenses the refrigerant, such that sub-cooling of the refrigerant may be easily performed.

Furthermore, since the refrigerant where the sub-cooling is formed is evaporated to a lower temperature in the evaporator 58, a temperature of a coolant that exchanges heat in the evaporator 58 may be further lowered, improving cooling performance and efficiency.

That is, while iteratively performing the above-stated process, the refrigerant cools the interior of the vehicle in the cooling mode, and at the same time, cools the coolant through heat exchange while passing through the chiller 60.

The coolant cooled in the chiller 60 is introduced into the battery module 30 while flowing along the battery coolant line 31 connected to the branch line 70 through operation of the third valve V3. Accordingly, the battery module 30 may be efficiently cooled by the low-temperature coolant supplied to the battery coolant line 31.

In the exemplary embodiment of the present invention, operation in a case of recovering waste heat of an external air heat source and the electrical component in the heating mode of the vehicle will be described with reference to FIG. 4.

Figure 4:
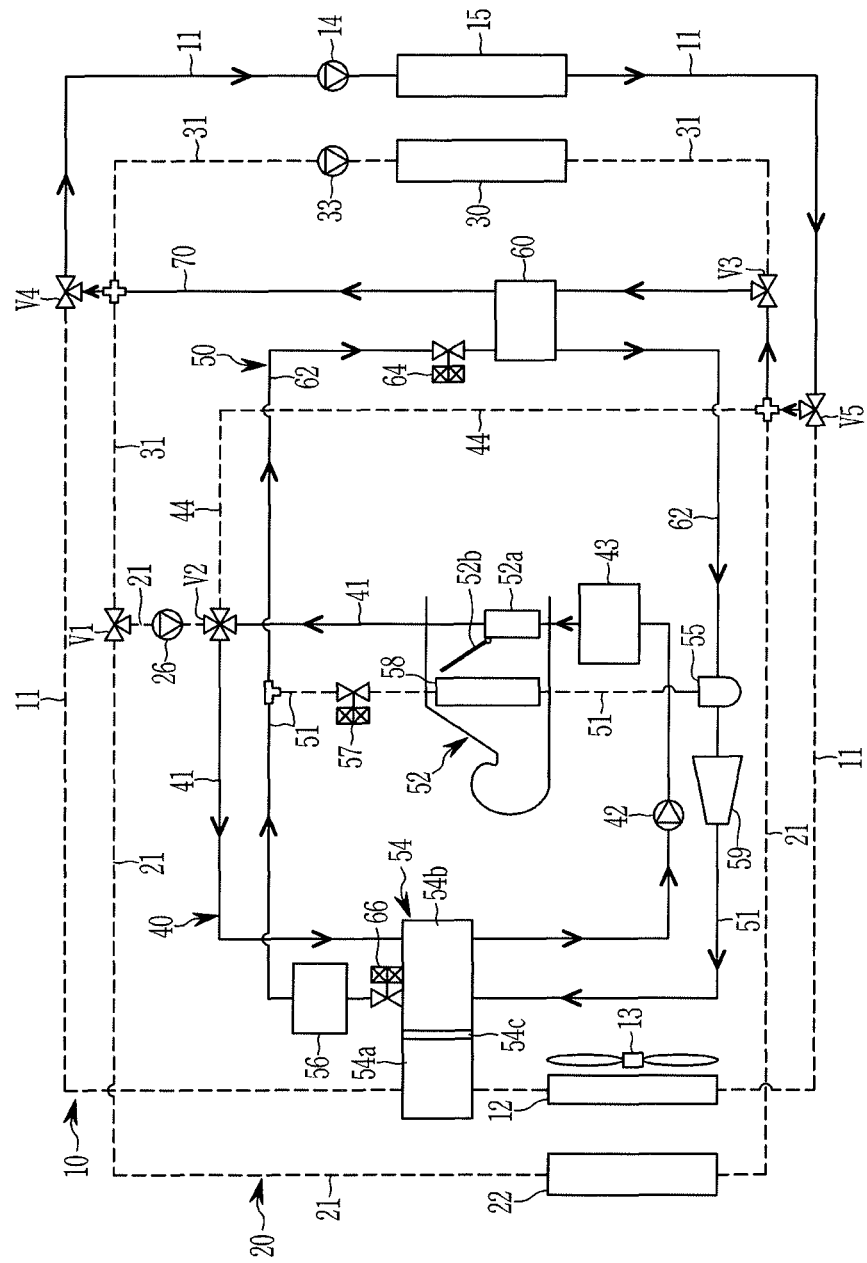
FIG. 4 is an operation state view with respect to the waste heat recovery of the external air heat source and the electrical component in the heating mode of the heat pump system for the vehicle according to the exemplary embodiment of the present invention.

FIG. 4 is an operation state view with respect to the waste heat recovery of the external air heat source and the electrical component in the heating mode of the heat pump system for the vehicle according to the exemplary embodiment of the present invention.

Referring to FIG. 4, the heat pump system may absorb waste heat of the electrical component 15, and an external heat source from the external air.

First, the first water pump 14 is actuated in the first cooling device 10. The first coolant line 11 that connects the first radiator 11 and the electrical component 15 is closed through operation of the fourth and fifth valves V4 and V5.

The branch line 70 is connected to the first coolant line 11 connected to the electrical component 15 while being opened through operation of the third and fourth valves V3 and V4.

Accordingly, the coolant circulates in the electrical component 15 through operation of the first water pump 14.

The coolant passed through the electrical component 15 may pass through the chiller 60 through the branch line 70 while passing through a portion of the second connection line 22 connected through the fifth valve V5 and a portion of the second coolant line 21 connected to the third valve V3 while crossing the second connection line 44.

Next, the coolant passed through the chiller 60 may be introduced into the electrical component 15 along the first coolant line 11 connected to the branch line 70.

That is, the coolant passed through the electrical component 15 continuously circulates along a portion of the second coolant line 21 and a portion of the second connection line 44 for connection of the first coolant line 11, the branch line 70, and the branch line 70 without passing through the first radiator 12, and absorbs the waste heat from the electrical component 15 such that a temperature is increased.

The temperature-increased coolant may exchange heat with the refrigerant while passing through the chiller 60.

Since operation of the second water pump 26 is stopped in the second cooling device 20, circulation of the coolant is stopped. Furthermore, since the third water pump 33 stops operating in the battery module 30, circulation of the coolant through the battery coolant line 31 is stopped.

In the heating device 40, the first connection line 41 is opened through operation of the second valve V2, and the first connection line 41 may form an independent closed circuit while the second connection line 44 is in the closed state.

Accordingly, the coolant is circulated to the first connection line 41 through operation of the fourth water pump 42 in the heating device 40. The coolant circulating through the first connection line 41 is supplied to the main heat exchanger 54.

Meanwhile, each constituent element operates in the air conditioning device 50 such that a refrigerant circulates along the refrigerant line 51.

Here, the refrigerant line 51 that connects the main heat exchanger 54 and the evaporator 58 is closed through operation of the first expansion valve 57.

Furthermore, the second expansion valve 64 may connect the refrigerant line 51 and the refrigerant connection line 62 to allow the main heat exchanger 54 to be connected to the chiller 60 through the sub-heat exchanger 56.

Here, the second expansion valve 64 and the third expansion valve 66 expand a refrigerant and respectively supply the expanded refrigerant to the sub-heat exchanger 56 and the chiller 60.

Accordingly, the refrigerant passing through the sub-heat exchanger 56 is evaporated while absorbing an external air heat source such that a temperature thereof is increased. The coolant of which the temperature is increased is expanded in the second expansion valve 64 again and then supplied to the chiller 60. The refrigerant supplied to the chiller 60 exchanges heat with the coolant of which the temperature is increased by absorbing the waste heat of the electrical component 15 such that a temperature of the refrigerant is increased.

The refrigerant passed through the chiller 60 passes through the accumulator 55 connected through the refrigerant connection line 62, and then is supplied to the compressor 59.

The refrigerant supplied to the accumulator 55 is divided into gas and liquid, and the gaseous refrigerant is supplied to the compressor 59.

A refrigerant discharged from the compressor 59 is supplied to the main heat exchanger 54.

Accordingly, the main heat exchanger 54 condenses the refrigerant by use of a coolant flow along the first connection line 41.

That is, the coolant supplied to the main heat exchanger 54 through the first connection line 41 may condense a refrigerant passing through the second radiator 54b of the main heat exchanger 54.

Here, the heating device 40 circulates the coolant of which the temperature is increased due to heat exchange with the refrigerant in the main heat exchanger 54 in the first connection line 41, and supplies the temperature-increased coolant to the water-cooled type of internal heater 52a to perform warming of the interior of the vehicle.

In the instant case, the coolant heater 43 is selectively actuated when a temperature of the coolant circulating through the first connection line 41 is lower than a predetermined temperature. Such a coolant heater 43 increases the temperature of the coolant and supplies the temperature-increased coolant to the water-cooled type of internal heater 52a.

Here, door 52b is opened to allow external air introduced into the HVAC module 52 and passed through the evaporator 58 to pass through the water-cooled type of internal heater 52a.

Accordingly, the external air introduced from the outside thereof is in a room-temperature state without being cooled when passing through the evaporator 58 where a refrigerant is not supplied. The introduced external air is changed into a high-temperature state while passing through the water-cooled type of internal heater 52a, and the high-temperature external air is introduced into the interior of the vehicle such that the interior of the vehicle is warmed.

That is, the heat pump system according to the exemplary embodiment of the present invention absorbs the external air heat source in the sub-heat exchanger 56 and the waste heat of the electrical component 15 is absorbed in the chiller 60 to increase a temperature of a refrigerant in the heating mode of the vehicle so that power consumption of the compressor 58 may be reduced and heating efficiency may be improved.

In the exemplary embodiment of the present invention, operation in a case of performing the heating mode of the vehicle by use of the waste heat of the electrical component will now be described with reference to FIG. 5.

Figure 5:
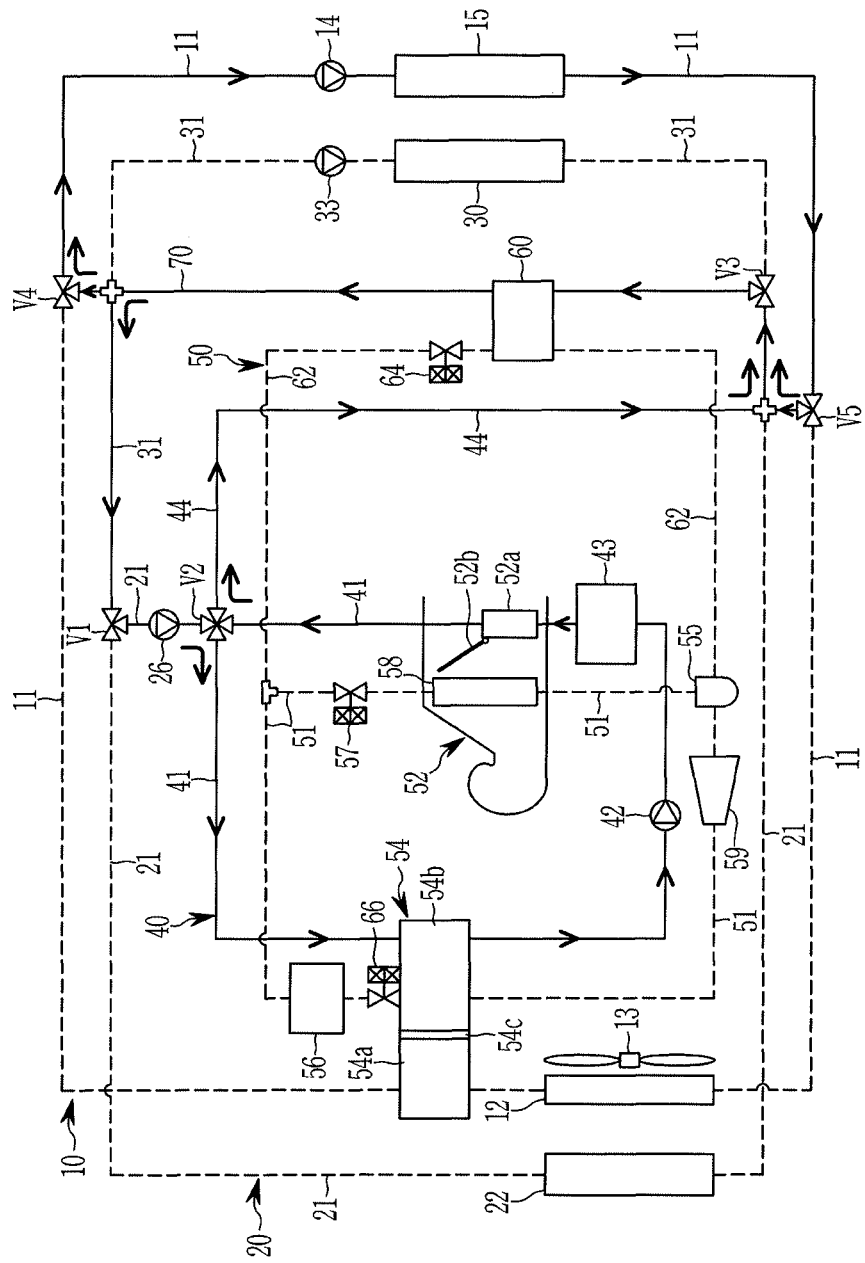
FIG. 5 is an operation state view in a case of performing the heating mode by recovering the waste heat of the electrical component in the heat pump system according to the exemplary embodiment of the present invention.

FIG. 5 is an operation state view in a case of performing the heating mode by recovering the waste heat of the electrical component in the heat pump system according to the exemplary embodiment of the present invention.

Referring to FIG. 5, the heat pump system may realize vehicle interior warming by use of the waste heat of the electrical component 15.

First, the first water pump 14 is actuated in the first cooling device 10. In the instant case, the first coolant line 11 that connects the first radiator 11 and the electrical component 15 is closed through operation of the fourth and fifth valves V4 and V5.

The branch line 70 is connected to the first coolant line 11 which is connected to the electrical component 15 while being opened through operation of the third and fourth valves V3 and V4.

Accordingly, a coolant circulates through the electrical component 15 through operation of the first water pump 14.

The coolant passed through the electrical component 15 may pass through a portion of the second connection line 44 connected through the fifth valve V5 and a portion of the second coolant line 21 connected to the third valve V3 while crossing the second connection line 44, and then may pass through the chiller 60 through the branch line 70.

Next, a portion of the coolant passed through the chiller 60 may be introduced to the electrical component 15 again along the first coolant line 11 connected to the branch line 70.

That is, the coolant passed through the electrical component 15 continuously circulates along the first coolant line 11, the branch line 70, a portion of the second coolant line 21 that connects the branch line 70 and the first coolant line 11, and a portion of the second connection line 44, and absorbs waste heat from the electrical component 15 such that a temperature of the coolant is increased.

In the second cooling device 20, the second coolant line 21 connected to the second radiator 22 and the battery coolant line 31 connected to the battery module 31 are closed through operation of the first and third valves V1 and V3.

In such a state, the rest of the coolant passed through the chiller 60 circulates through a portion of the battery coolant line 31 connected to the first valve V1, while crossing the branch line 70, and the second coolant line 21 connected to the second valve V2 through operation of the second water pump 26.

Since the third water pump 33 stops operating in the battery module 30, circulation of the coolant through the battery coolant line 31 is stopped.

In the heating device 40, the first and second connection lines 41 and 44 are opened through operation of the second valve V2.

Accordingly, the coolant introduced into the second coolant line 21 connected to the second valve V2 may circulate through the first connection line 41 and the second connection line 44 through operation of the fourth water pump 42.

That is, the first connection line 41 introduced into the first connection line 41 passes through the coolant heater 43 and the water-cooled type of internal heater 52a while flowing toward the main heat exchanger 54 with reference to the second valve V2.

Next, the coolant partially passes through the second coolant line 21 connected through the third valve V3 while flowing along the second connection line 44, and then may be introduced into the branch line 70.

As described, the coolant flowing along the second connection line 44 passes through the portion of the second coolant line 21 connected through the third valve V3 and then introduced into the branch line 70 while the connection with the first coolant line 11 is closed through operation of the fifth valve V5.

In the instant case, the coolant of which a temperature is increased while passing through the electrical component 15 is joined with a coolant passed through the second connection line 44 in the branch line 70 such that the temperature may be increased.

Meanwhile, the respective constituent elements of the air conditioning device 50 stop operating, and accordingly, circulation of the refrigerant is stopped.

Accordingly, the heating device 40 circulates the coolant of which the temperature is increased while passing through the waste heat of the electrical component 15 to perform the internal warming by supplying the coolant into the water-cooled type of internal heater 52a.

In the instant case, the coolant heater 43 is selectively actuated when a temperature of a coolant circulating through the first connection line 41 is lower than a predetermined temperature. Such a coolant heater 43 may increase a temperature of a coolant and then supply the temperature-increased coolant to the water-cooled type of internal heater 52a.

Here, the door 52b is opened such that external air introduced into the HVAC module 52 and then passed through the evaporator 58 can pass through the water-cooled type of internal heater 52a.

Accordingly, when the external air introduced from the outside thereof is passed through the evaporator 58 where refrigerant circulation is stopped, the external air is introduced in a room temperature state without being cooled. The introduced external air is changed to a high temperature state while passing through the water-cooled type of internal heater 52a, and thus high-temperature external air is introduced into the interior of the vehicle, warming the interior of the vehicle.

That is, the heat pump system according to the exemplary embodiment of the present invention can warm the interior of the vehicle by use of a coolant of which a temperature is increased by the waste heat of the electrical component 15 without actuating the air conditioning device 50 in the heating mode of the vehicle, and thus power consumption may be reduced.

In the exemplary embodiment of the present invention, operation in the case of recovering an external air heat source and waste heat of the electrical component 15 in the heating and dehumidification modes of the vehicle will be described in with reference to FIG. 6.

Figure 6:
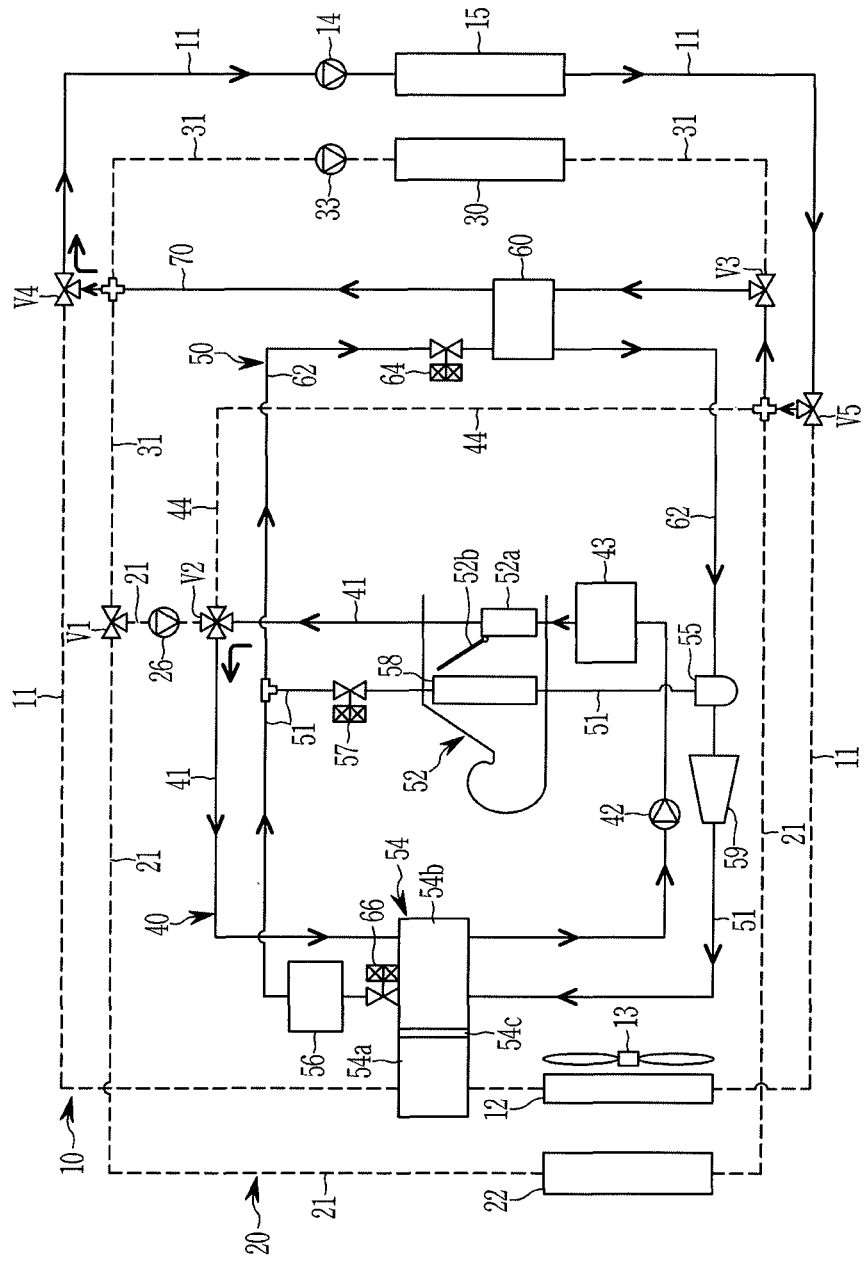
FIG. 6 is an operation state view according to the heating and dehumidification modes in the heat pump system for the vehicle according to the exemplary embodiment of the present invention.

FIG. 6 is an operation state view according to the heating and dehumidification modes in the heat pump system for the vehicle according to the exemplary embodiment of the present invention.

Referring to FIG. 6, the heat pump system may absorb waste heat of the electrical component 15 and an external air heat source from the outside.

First, the first water pump 14 is actuated in the first cooling device 10. Here, the first coolant line 11 that connects the first radiator 11 and the electrical component 15 is closed through operation of the fourth and fifth valves V4 and V5.

The branch line 70 is connected to the first coolant line 11 which is connected to the electrical component 15 while being opened through operation of the third and fourth valves V3 and V4.

Accordingly, a coolant circulates through the electrical component 15 through operation of the first water pump 14.

The coolant passed through the electrical component 15 may pass through a portion of the second connection line 44 connected through the fifth valve V5 and a portion of the second coolant line 21 connected to the third valve V3 while crossing the second connection line 44, and then pass through the chiller 60 through the branch line 70.

Next, the coolant passed through the chiller 60 may be introduced back into the electrical component 15 along the first coolant line 11 connected to the branch line 70.

That is, the coolant passed through the electrical component 15 continuously circulates through the first coolant line 11, the branch line 70, a portion of the second coolant line 21 connecting the branch line 70 and the first coolant line 11, and the first connection line 44 without passing through the first radiator 12, and absorbs waste heat from the electrical component 15 such that a temperature of the coolant is increased.

The coolant of which the temperature is increased may exchange heat with a refrigerant while passing through the chiller 60.

In the second cooling device 20, the second water pump 26 stops operating and thus circulation of the coolant is stopped. Furthermore, since operation of the third water pump 33 is stopped, circulation of the coolant is stopped in the battery module 30.

In the heating device 40, the first connection line 41 is opened through operation of the second valve V2, and may form an independently closed circuit while the second connection line 44 is in a closed state.

Accordingly, a coolant circulates through the first connection line 41 through operation of the fourth water pump 42 in the heating device 40. The coolant circulating through the first connection line 41 is supplied to the main heat exchanger 54.

Meanwhile, the respective constituent elements of the air-conditioning device 50 operate such that a refrigerant circulates along the refrigerant line 51.

Here, the refrigerant line 51 connecting the main heat exchanger 54 and the evaporator 58 is opened through operation of the first expansion valve 57.

The first expansion valve 57 expands a portion of refrigerant supplied from the sub-heat exchanger 56 and supplies the expanded refrigerant to the evaporator 58. The refrigerant passed through the evaporator 58 is passed through the accumulator 55 and then is supplied to the compressor 59. Next, a refrigerant discharged from the compressor 59 may be supplied to the main heat exchanger 54.

Meanwhile, the second expansion valve 64 may connect the refrigerant line 51 and the refrigerant connection line 62 to connect the main heat exchanger 54 with the chiller 60 through the sub-heat exchanger 56.

Here, the second expansion valve 64 and the third expansion valve 66 expand a refrigerant and supply the expanded refrigerant to the sub-heat exchanger 56 and the chiller 60, respectively.

Accordingly, a refrigerant passed through the sub-heat exchanger 56 evaporates by absorbing the external air heat source such that a temperature thereof is increased. The refrigerant of which the temperature is increased is expanded again in the second expansion valve 64 and then supplied to the chiller 60.

The refrigerant supplied to the chiller 60 evaporates while exchanging heat with the coolant of which a temperature is increased by absorbing the waste heat of the electrical component 15 and thus a temperature of the refrigerant is increased.

The refrigerant passed through the chiller 60 passes through the accumulator connected through the refrigerant connection line 62 and then is supplied to the compressor 59.

The refrigerant supplied to the accumulator 55 is divided into gas and liquid, and a gaseous refrigerant is supplied to the compressor 59.

The refrigerant discharged from the compressor 59 is supplied to the main heat exchanger 54.

Accordingly, the main heat exchanger 54 condenses the refrigerant by use of the coolant flowing along the first connection line 41.

That is, the coolant supplied to the main heat exchanger 54 through the first connection line 41 may condense a refrigerant that passes through the second radiator 54b of the main heat exchanger 54.

Here, the heating device 40 supplies a coolant of which a temperature is increased by exchanging heat with the refrigerant in the main heat exchanger 54 while circulating the temperature-increased coolant to the first connection line 41 to perform warming of the interior of the vehicle.

In the instant case, the coolant heater 43 is selectively actuated when a temperature of the coolant circulating through the first connection line 41 is lower than a predetermined temperature. Such a coolant heater 43 may increase a temperature of a coolant and supply the temperature-increased coolant to the water-cooled type of internal heater 52a.

Here, the door 52b is opened so that external air introduced into the HVAC module 52 and then passed through the evaporator 58 can pass through the water-cooled type of internal heater 52a.

That is, the external air introduced into the HVAC module 52 is dehumidified while passing through the evaporator 58 by a low-temperature refrigerant introduced into the evaporator 58. Next, the external air is changed into a high-temperature state while passing through the water-cooled type of internal heater 52a, and the high-temperature external air is introduced into the interior of the vehicle so that the interior of the vehicle is warmed and dehumidified.

That is, the heat pump system according to the exemplary embodiment of the present invention absorbs the external air heat source in the sub-heat exchanger 56 and the waste heat of the electrical component 15 is absorbed in the chiller 60 to increase a temperature of a refrigerant in the heating and dehumidification modes of the vehicle so that power consumption of the compressor 58 may be reduced and heating efficiency may be improved.

In the exemplary embodiment of the present invention, operation in the case of increasing a temperature of the battery module 30 by use of the coolant heater 43 will be described with reference to FIG. 7.

Figure 7:
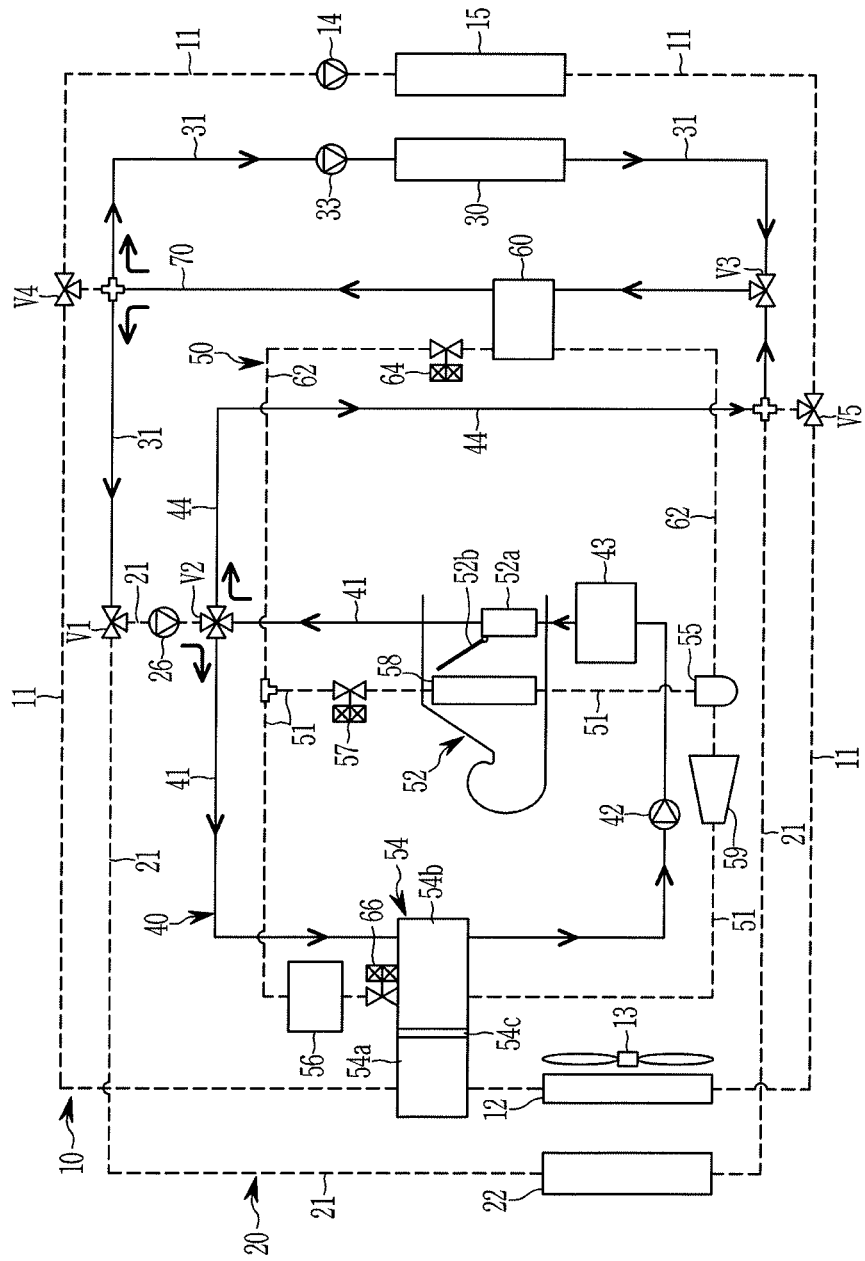
FIG. 7 is an operation state view of a temperature increase of the battery module in the heat pump system for the vehicle according to the exemplary embodiment of the present invention.

FIG. 7 is an operation state view of a temperature increase of the battery module in the heat pump system for the vehicle according to the exemplary embodiment of the present invention.

First, in the first cooling device 10, the first water pump 14 stops operating and thus circulation of the coolant is stopped in the first coolant line 11.

In the second cooling device 20, the second coolant line 21 connected to the second radiator 22 is closed through operation of the first valve V1, and the battery coolant line 31 connected to the battery module 31 is opened.

The branch line 70 is opened through operation of the third valve V3. Such a branch line 70 may be connected to the battery coolant line 31 which is connected to the battery module 30 while the connection with the first coolant line 11 is closed through operation of the fourth valve V4.

Accordingly, a coolant may circulate through the battery module 30 through operation of the third water pump 33.

That is, a portion of the coolant passed through the battery module 30 and flowing along the branch line 70 circulates through the battery module 30 through operation of the third water pump 33.

Furthermore, the rest of the coolant passed through the branch line 70 circulates through the battery coolant line 31 connected to the first valve V1 while crossing the branch line 70, and the second coolant line 21 through operation of the second water pump 26.

Furthermore, the rest of the coolant passed through the branch line 70 circulates through the battery module 30 through operation of the third water pump 33.

In the heating device 40, the first and second connection lines 41 and 44 are opened through operation of the second valve V2.

Accordingly, the coolant introduced into the second coolant line 21 connected to the second valve V2 may circulate through the first connection line 41 and the second connection line 44 through operation of the fourth water pump 42.

That is, the coolant introduced into the first connection line 41 passes through the coolant heater 43 and the water-cooled type of internal heater 52a while flowing toward the main heat exchanger 54 with reference to the second valve V2.

Next, the coolant may pass through a portion of the second coolant line 21 connected through the third valve V3, and may be introduced into the branch line 70 while flowing along the second connection line 44.

As described, the coolant flowing along the second connection line 44 is passed through the portion of the second coolant line 21 connected through the third valve V3, and then is introduced into the branch line 70 while the connection with the first coolant line 11 is closed through operation of the fifth valve V5.

Here, the coolant heater 43 heats the coolant supplied through the first connection line 41 to increase a temperature.

That is, the coolant of which the temperature is increased through operation of the coolant heater 43 is introduced into the branch line 70 through the second connection line 44 and a portion of the second coolant line 21.

A portion of the high-temperature coolant passed through the branch line 70 is supplied to the battery module 30 through operation of the third water pump 33.

Accordingly, a temperature of the battery module 30 may be effectively increased by the high-temperature coolant supplied through the battery coolant line 31.

Thus, according to an exemplary embodiment of the present invention, the battery module 30 may be cooled by use of one chiller 60 where a coolant and a refrigerant exchange heat, and waste heat of the electrical component 15 is absorbed by applying the battery cooling system in the electric vehicle, facilitating simplification of a system.

Furthermore, according to an exemplary embodiment of the present invention, the performance of the battery module 30 may be optimized by efficiently warming and cooling the battery module 30 according to a mode of the vehicle, and the overall travel distance of the vehicle may be increased by effectively managing the battery module 30.

Furthermore, according to an exemplary embodiment of the present invention, heating efficiency may be improved by selectively recovering the external heat source and the waste heat of the electrical component 15 in the heating mode of the vehicle for interior warming.

Also, according to an exemplary embodiment of the present invention, the condensation performance of the refrigerant may be improved through the first cooling device 10 and the main heat exchanger 54, which double-condenses the refrigerant, using each coolant supplied from the second cooling device 20 through the heating device 40, and thus cooling performance may be improved and power consumption of the compressor 59 may be reduced.

Furthermore, the waste heat of the electrical component 15 may be directly used in the heating mode of the vehicle, reducing power consumption according to an exemplary embodiment of the present invention.

In an exemplary embodiment of the present invention, a controller is connected to the heat pump system, for instance to the first to fifth valves V1 to V5 to control the heat pump system. The controller may be at least one microprocessor operated by a predetermined program which may include a series of commands control the heat pump system in accordance with various exemplary embodiments of the present invention.

Furthermore, according to an exemplary embodiment of the present invention, it is possible to reduce production cost and weight by simplifying the entire system and improve space utilization.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the system comprising:
    a first cooling device that includes a first radiator and a first water pump connected through a first coolant line, and circulates a coolant in the first coolant line to cool at least one electrical component;
    a second cooling device that includes a second radiator and a second water pump connected through a second coolant line, and circulates a coolant in the second coolant line;
    a battery module which is mounted in a battery coolant line selectively connectable to the second coolant line through a first valve, and in which a coolant circulates through operation of a third water pump mounted in the battery coolant line;
    a heating device that includes first and second connection lines selectively connectable to the second coolant line through a second valve, and a fourth water pump and a coolant heater mounted in the first connection line to warm the interior of the vehicle with a heated coolant; and
    a chiller which is mounted in a branch line connected to the battery coolant line through a third valve and through which the coolant passes, connected to a refrigerant line of an air conditioner through a refrigerant connection line, and controls a temperature of the coolant through heat exchange between a selectively introduced coolant and a refrigerant supplied from the air conditioner, wherein a first heat exchanger mounted in the air conditioner is connected to the first coolant line and the first connection line so that a coolant circulating through the first cooling device and a coolant circulating through the heating device which is connected to the second cooling device respectively pass therethrough, and wherein a refrigerant passing through the first heat exchanger exchanges heat with a coolant supplied through the first coolant line in the main heat exchanger, and then exchanges heat with a coolant supplied through the first connection line.

2. The heat pump system for the vehicle of claim 1, wherein the air conditioner includes:

an HVAC module including a water-cooled internal heater connected to the first connection line to supply a heated coolant in a heating mode of the vehicle, and an door configured of controlling external air passed through an evaporator of the HVAC module to be selectively introduced into the water-cooled internal heater according to a cooling mode, the heating mode, and a dehumidification mode of the vehicle;

a compressor connected through the refrigerant line between the evaporator and the main heat exchanger;

a first expansion valve which is mounted in the refrigerant line that connects the first heat exchanger and the evaporator;

a second expansion valve which is mounted at a front end portion of the chiller in the refrigerant connection line;

an accumulator which is mounted in the refrigerant line between the evaporator and the compressor, and connected to the refrigerant connection line;

a second heat exchanger which is mounted in the refrigerant line between the first heat exchanger and the evaporator; and a third expansion valve which is mounted in the refrigerant line between the first heat exchanger and the sub-heat exchanger.

3. The heat pump system for the vehicle of claim 2, wherein the second heat exchanger condenses a refrigerant condensed in the first heat exchanger through heat exchange with external air when the first heat exchanger condenses the refrigerant, and when the third expansion valve expands a refrigerant and supplies the expanded refrigerant, the second heat exchanger evaporates the refrigerant condensed in the first heat exchanger through heat exchange with external air.

4. The heat pump system for the vehicle of claim 2, wherein the third expansion value expands a refrigerant passed through the first heat exchanger and supplies the expanded refrigerant to the second heat exchanger in the heating mode of the vehicle.

5. The heat pump system of claim 2, wherein the second expansion valve is actuated when the battery module is cooled by use of a refrigerant, and expands a refrigerant introduced through the refrigerant connection line and introduces the expanded refrigerant to the chiller.

6. The heat pump system for the vehicle of claim 2, wherein the first expansion valve expands a refrigerant passed through the first heat exchanger in the cooling mode or in the heating and dehumidification modes of the vehicle.

7. The heat pump system for the vehicle of claim 2, wherein the first valve is configured to selectively connect the second coolant line and the battery coolant line, or the second coolant line and the first connection line;

wherein the branch line is connected to the third valve through a first end portion thereof, and a second end portion of the branch line is connected to the first coolant line between the first radiator and the first water pump through a fourth valve while crossing the battery coolant line between the first valve and the battery module; and wherein the second connection line is connected to the second valve through a first end portion thereof, and a second end portion of the second connection line is connected to the first coolant line between the at least one electrical component and the first radiator through a fifth valve while crossing the second coolant line between the second radiator and the third valve.

8. The heat pump system for the vehicle of claim 7, wherein, when the at least one electrical component is cooled by use of a coolant cooled by the first radiator and the battery module is cooled by use of a coolant cooled by the second radiator, the first valve connects the second coolant line and the battery coolant line, and closes the second coolant line connected to the second valve, the third and fourth valves close the branch line, a coolant circulates through the first coolant line through operation of the first water pump to supply a coolant to the at least one electrical component, a coolant circulates through the second coolant line, the battery coolant line, and the battery module through operation of the third water pump to supply a coolant to the battery module, and the first cooling device and the second cooling device respectively form independent closed circuits for circulation of the coolant.

9. The heat pump system for the vehicle of claim 7, wherein, when the at least one electrical component and the battery module are cooled in the cooling mode of the vehicle, in the first cooling device, the connection with the branch line is blocked through operation of the fourth valve, a coolant cooled in the first radiator circulates through the electric component through operation of the first water pump, the fourth valve, and the fifth valve, the battery coolant line is connected to the branch line opened through operation of the third valve, and the connection with the second coolant line is closed through operation of the first and third valves, the second coolant line and the first and second connection lines are connected through operation of the second valve, and in the air conditioner, a refrigerant circulates along the refrigerant line through operation of the first expansion valve, the second expansion valve expands a refrigerant such that the expanded refrigerant is introduced into the chiller through the refrigerant connection line, and the third expansion valve does not expand a refrigerant passed through the first heat exchanger and supplies the refrigerant to the sub-heat exchanger.

10. The heat pump system for the vehicle of claim 9, wherein, in the first cooling device, a coolant cooled in the first radiator is supplied to the first heat exchanger through operation of the first water pump, in the second cooling device, a coolant cooled in the second radiator is supplied to the first heat exchanger connected to the first connection line while circulating along the first and second connection lines through operation of the second and fourth water pumps, and the first heat exchanger condenses a refrigerant through heat exchange with the respective coolants.

11. The heat pump system for the vehicle of claim 7, wherein, when an external heat source and waste heat of the at least one electrical component are recovered in the heating mode of the vehicle,
in the first cooling device, the first coolant line that connects the first radiator and the at least one electrical component is closed through operation of the fourth and fifth valves,
the branch line is connected to the first coolant line which is connected to the at least one electrical component while being opened through operation of the third and fourth valves,
a coolant circulates through the at least one electrical component through operation of the first water pump,
the coolant passed through the at least one electrical component passes through a portion of the second connection line connected through the fifth valve and a portion of the second coolant line connected to the third valve while crossing the second connection line, and then passes through the chiller through the branch line,
the second and third water pumps stop operating,
in the heating device, the first connection line is opened through operation of the second valve, and the first connection line forms an independent closed circuit while being in a closed state,
in the air conditioner, the refrigerant that connects the first heat exchanger and the evaporator is closed through operation of the first expansion valve,
the refrigerant line and the refrigerant connection line are connected to connect the first heat exchanger and the chiller through operation of the second expansion valve, and
the second expansion valve and the third expansion valve expand refrigerants and supply the expanded refrigerants respectively to the second heat exchanger and the chiller.

12. The heat pump system for the vehicle of claim 7, wherein, when an external air heat source and waste heat of the at least one electrical component are recovered in the heating and dehumidification modes of the vehicle,
in the first cooling device, the first coolant line that connects the first radiator and the at least one electrical component is closed through operation of the fourth and fifth valves,
the branch line is connected to the first coolant line which is connected to the at least one electrical component while being opened through operation of the third and fourth valves,
a coolant circulates through the at least one electrical component through operation of the first water pump,
the coolant passed through the at least one electrical component passes through a portion of the second connection line connected through the fifth valve and a portion of the second coolant line connected to the third valve while crossing the second connection line, and then passes through the chiller through the branch line,
the second and third water pumps stop operating,
in the heating device, the first connection line is opened through operation of the second valve, the first connection line forms an independent closed circuit while the second connection line is in a closed state, and a coolant circulates through the first connection line through operation of the fourth water pump,
in the air conditioner, the refrigerant line that connects the first heat exchanger and the evaporator is opened through operation of the first expansion valve,
the refrigerant line and the refrigerant connection line are connected to connect the first heat exchanger and the chiller through operation of the second expansion valve, and
the first, second, and third expansion valves respectively expand refrigerants and respectively supply the expanded refrigerants to the sub-heat exchanger, the evaporator, and the chiller.

13. The heat pump system of claim 7, wherein, when the heating mode of the vehicle is conducted with water heat of the at least one electrical component,
in the first cooling device, the first coolant line that connects the first radiator and the at least one electrical component is closed through operation of the fourth and fifth valves,
the branch line is connected to the first coolant line which is connected to the at least one electrical component while being opened through operation of the third and fourth valves,
a coolant circulates through the at least one electrical component through operation of the first water pump,
the coolant passed through the at least one electrical component passes through a portion of the second connection line connected through the fifth valve and a portion of the second coolant line connected to the third valve while crossing the second connection line, and then passes through the chiller through the branch line,
in the second cooling device, the second coolant line connected to the second radiator and the battery coolant line connected to the battery module are closed through operation of the first and third valves,
a coolant circulates through the battery coolant line connected to the first valve while crossing the branch line and the second coolant line connected to the first valve through operation of the second water pump,
the third water pump stops operating, and
in the heating device, the first and second connection lines are opened through operation of the second valve, a coolant introduced into the second coolant line connected to the second valve circulates through the first connection line and the second connection line through operation of the fourth water pump.

14. The heat pump system for the vehicle of claim 7, wherein, when a temperature of the battery module is increased,
the first water pump stops operating and thus circulation of the coolant stops in the first coolant line in the first cooling device,
the second coolant line connected to the second radiator is closed and the battery coolant line connected to the battery module is opened in the second cooling device through operation of the first valve,
the branch line is opened through operation of the third valve, and the branch line is connected to the battery coolant line which is connected to the battery module while the connection with the first coolant line is closed through operation of the fourth valve,
a portion of the coolant passed through the battery module and flowed along the branch line circulates through the battery coolant line and the second coolant line connected to the first valve while crossing the branch line through the second water pump,
a rest of the coolant circulates through the battery module through operation of the third water pump, in the heating device, the first and second connection lines are opened through operation of the second valve, and the coolant introduced into the second coolant line connected to the second valve circulates through the first connection line and the second connection line through operation of the fourth water pump, and the coolant flowing along the second connection line is introduced into the branch line through the portion of the second coolant line connected through the third valve while the connection with the first coolant line is closed through operation of the fifth valve.

15. The heat pump system for the vehicle of claim 2, wherein the first, second, and expansion valves are electronic expansion valves that selectively expand a refrigerant while controlling a flow of the refrigerant.

16. The heat pump system for the vehicle of claim 1, wherein the heating device in the heating mode of the vehicle carries out heating of the interior of the vehicle by use of waste heat generated from the at least one electrical component in a state that operation of the air conditioner is stopped.

17. The heat pump system for the vehicle of claim 1, wherein the chiller recovers waste heat of the at least one electrical component through heat exchange between a coolant passed through the at least one electrical component and a refrigerant in the heating mode of the vehicle, and when the battery module is cooled, a coolant supplied to the battery module is cooled through heat exchange with a refrigerant.

18. The heat pump system for the vehicle of claim 1, wherein the first heat exchanger includes:

a first radiator connected to the first coolant line;

a second radiator connected to the first connection line; and a partition wall that partitions the first heat exchanger into the first radiator and the second radiator to prevent coolants respectively supplied from the first cooling device and the heating device connected to the second cooling device from being mixed, and allows a refrigerant to pass therethrough.

\* \* \* \* \*